United States Patent
Sakae et al.

(10) Patent No.: US 9,240,737 B2
(45) Date of Patent: Jan. 19, 2016

(54) CONTROL DEVICE FOR SWITCHING POWER SUPPLY CIRCUIT, AND HEAT PUMP UNIT

(75) Inventors: Norio Sakae, Shiga (JP); Kazuhiro Ohshita, Shiga (JP); Toshio Yabuki, Shiga (JP); Junya Mitsui, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 4 days.

(21) Appl. No.: 14/343,709

(22) PCT Filed: Aug. 22, 2012

(86) PCT No.: PCT/JP2012/071190
§ 371 (c)(1),
(2), (4) Date: Mar. 7, 2014

(87) PCT Pub. No.: WO2013/035534
PCT Pub. Date: Mar. 14, 2013

(65) Prior Publication Data
US 2014/0223949 A1    Aug. 14, 2014

(30) Foreign Application Priority Data

Sep. 9, 2011   (JP) .................................. 2011-196874

(51) Int. Cl.
*H02M 1/42* (2007.01)
*H02M 7/23* (2006.01)
(Continued)

(52) U.S. Cl.
CPC ............. *H02M 7/23* (2013.01); *F25B 49/025* (2013.01); *H02M 3/1584* (2013.01); *F25B 30/02* (2013.01);
(Continued)

(58) Field of Classification Search
CPC ... H02M 1/4208; H02M 1/4225; H02M 3/1584
USPC .......... 323/222, 225, 271, 272, 282–285, 299
See application file for complete search history.

(56) References Cited

U.S. PATENT DOCUMENTS 7,116,087 B2 * 10/2006 Zhang et al. .................. 323/272
8,098,505 B1 * 1/2012 Choi ............................... 363/89
(Continued)

FOREIGN PATENT DOCUMENTS

CN          101471604 A    7/2009
JP          2000-308337 A  11/2000
(Continued)

OTHER PUBLICATIONS

International Search Report for PCT/JP2012/071190 mailed on Oct. 30, 2012.
(Continued)

*Primary Examiner* — Jessica Han
(74) *Attorney, Agent, or Firm* — Birch, Stewart, Kolasch & Birch, LLP

(57) ABSTRACT

A mode controller shifts, along with increase in an electric power in first and second of chopper circuits and, operation modes of the first and the second of the chopper circuits from a first mode to a third mode via a second mode. An operation controller causes, in the first mode, the first of chopper circuit to perform an chopping operation, and the second of chopper circuit to suspend the chopping operation, in the second mode, causes the first and the second of chopper circuits to alternatively perform the chopping operations, and in the third mode causes both of the first and the second of chopper circuits to perform the chopping operations.

13 Claims, 11 Drawing Sheets

(51) Int. Cl.
  *H02M 3/158* (2006.01)
  *F25B 49/02* (2006.01)
  H02M 1/00 (2007.01)
  F25B 30/02 (2006.01)
  H02M 1/32 (2007.01)

(52) U.S. Cl.
  CPC ........ *F25B 2600/021* (2013.01); *H02M 1/4225* (2013.01); *H02M 2001/0032* (2013.01); *H02M 2001/327* (2013.01); *H02M 2003/1586* (2013.01); *Y02B 70/126* (2013.01); *Y02B 70/16* (2013.01)

(56) References Cited

U.S. PATENT DOCUMENTS

| | | | | |
|---|---|---|---|---|
| 8,111,055 | B2* | 2/2012 | Landwehr | 323/272 |
| 8,476,879 | B2* | 7/2013 | Gaboury et al. | 323/272 |
| 8,614,902 | B2* | 12/2013 | Pansier et al. | 363/89 |
| 2009/0168475 | A1* | 7/2009 | Hirosawa | 363/84 |
| 2011/0080151 | A1 | 4/2011 | Rahardjo et al. | |
| 2011/0132899 | A1 | 6/2011 | Shimomugi et al. | |
| 2012/0313614 | A1* | 12/2012 | Ohshita et al. | 323/311 |

FOREIGN PATENT DOCUMENTS

| | | |
|---|---|---|
| JP | 2002-044941 A | 2/2002 |
| JP | 2008-193818 A | 8/2008 |
| JP | 2009-159727 A | 7/2009 |
| JP | 2012-016164 A | 1/2012 |

OTHER PUBLICATIONS

Kitamura et al., Critical Mode for Creating Power Supply against 1.5 kW Low Noise / Interleaved PFC IC R2A20112, Transistor Gijutsu, May 2008, CQ Publishing Co., Ltd., pp. 176-184.

Extended European Search Report issued in corresponding European Application No. EP 12829707.8 on Jul. 10, 2015.

* cited by examiner

FIG. 3
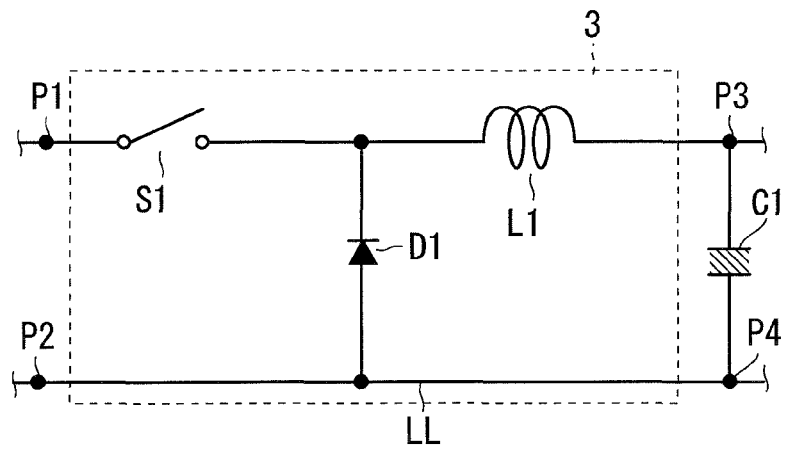
FIG. 4
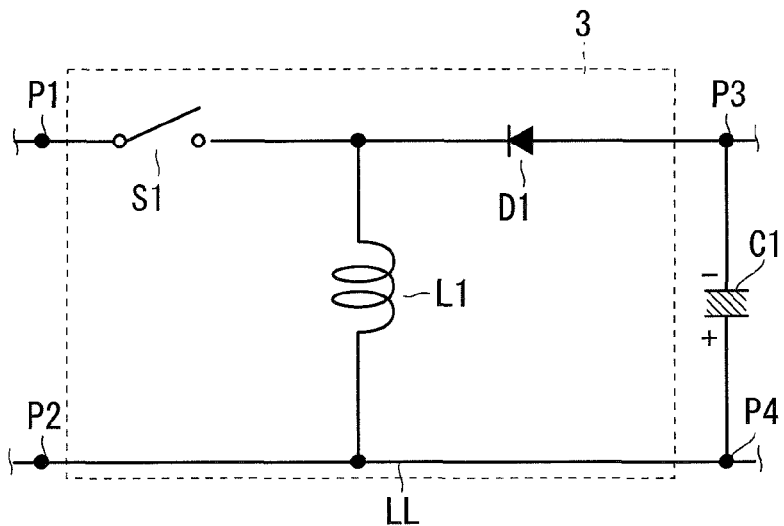
FIG. 5
| 3a | OPERATION |
| 3b | SUSPENSION |

CONTROL DEVICE FOR SWITCHING POWER SUPPLY CIRCUIT, AND HEAT PUMP UNIT

TECHNICAL FIELD

The present invention rerates to a control device for a switching power supply circuit and a heat pump unit, in particular to a control device for a switching power supply circuit having a plurality of chopper circuits.

BACKGROUND ART

Japanese Patent Application Laid-Open No. 2009-159727 discloses a power factor correct device having two step-up switching converters. In Japanese Patent Application Laid-Open No. 2009-159727, there are employed modes in which periods of operations of two step-up switching converters are different from each other, while switching the modes depending on an output current of the power factor correct device. In more detail, six modes are employed as these modes. In particular, the mode 0 is a mode in which the two step-up switching converters are made to operate continuously. The mode 1 is a mode in which operation/suspension of the two step-up switching converters is repeated such that parts of the operation periods of the two step-up switching converters are temporally overlapped. The mode 2 is a mode in which suspension periods of the step-up switching converters are longer than that in the mode 1. The mode 3 is a mode in which the suspension periods are still longer and the operations of the two step-up switching converters are not overlapped. The mode 4 is a mode in which one of the step-up switching converters is suspended, and the operation/suspension of the other step-up switching converter is repeated. The mode 5 is a mode in which the suspension period of the other switching converter is longer than that in the mode 4.

In Japanese Patent Application Laid-Open No. 2009-159727, when a load current is low and currents flowing through switching elements of the step-up switching converters are low, the mode 4 or the mode 5 is employed. By this, a power source efficiency is improved.

In addition, as technology related to the present invention, Japanese Patent Application Laid-Open No. 2008-193818 and Mamoru Kitamura, "Creating a 1.5 kW Low-Noise Power Supply with High Harmonic Suppression—The R2A20112 Critical Conduction Mode/Interleaving PFC IC", Transistor Gijutsu, May 2008 Issue, CQ Publishing Co., Ltd, August 2008, pp. 176-184. are disclosed.

SUMMARY OF INVENTION

Problems to be Solved by the Invention

In the modes 4 and 5 of Japanese Patent Application Laid-Open No. 2009-159727, one step-up switching converter is suspended, and the operation/suspension of the other step-up switching converter is repeated. Thus, variation of an input current is created due to this operation/suspension.

In view of the above, an object of the present invention is to provide a control device for a switching power supply circuit which can improve efficiency while reducing variation of the input current.

Means for Solving the Problems

A first aspect of a control device for a switching power supply circuit according to the present invention is a control device for a switching power supply circuit, including a pair of input terminals (P1, P2), a pair of output terminals (P3, P4), and a first and a second chopper circuits (3, 3a, 3b) which are parallely connected to each other between the pair of input terminals and the pair of output terminals and each of which performs a chopping operation, the control device including: a mode controller (51) which shifts an operation mode of the first and the second chopper circuits from a first mode to a third mode via a second mode as an electric power in the first and the second chopper circuits increases; and an operation controller (52) which causes, in the first mode, the first chopper circuit to perform the chopping operation, and the second chopper circuit to suspend the chopping operation, in the second mode, causes the first chopper circuit and the second chopper circuit to alternately perform the chopping operation, and in the third mode, causes both of the first chopper circuit and the second chopper circuit to perform the chopping operations.

A second aspect of the control device for a switching power supply circuit according to the present invention is the control device for a switching power supply circuit according to the first aspect, wherein a constant-voltage source is connected between the pair of input terminals, and the control device further includes: a current detection unit (60, 61, 62) which detects an input current (I) flowing through the pair of input terminals (P1, P2), wherein the mode controller (51) shifts the operation mode from the first mode to the third mode via the second mode as the input current increases.

A third aspect of the control device for a switching power supply circuit according to the present invention is the control device for a switching power supply circuit according to the first or the second aspect, the control device further including: a period detection unit (70) which counts elapsed time, wherein the operation controller (52) suspends, in the second mode, the chopping operation of the first chopper circuit on a condition that a predetermined period of time has elapsed since start of the chopping operation of the first chopper circuit (3a, 3b).

A fourth aspect of the control device for a switching power supply circuit according to the present invention is the control device for a switching power supply circuit according to the first or the second aspect, the control device further including: a second current detection unit (61) which detects a current flowing through the first chopper circuit (3a), wherein the operation controller (52) suspends, in the second mode, the chopping operation of the first chopper circuit on a condition that a value of an integrated current from start of the chopping operation of the first chopper circuit (3a, 3b) is greater than a predetermined value.

A fifth aspect of the control device for a switching power supply circuit according to the present invention is the control device for a switching power supply circuit according to the fourth aspect, wherein the mode controller (51) shifts the operation mode to the first mode on a condition that in the second mode, the current is lower than a predetermined value.

A sixth aspect of the control device for a switching power supply circuit according to the present invention is the control device for a switching power supply circuit according to the first or the second aspect, the control device further including: a second current detection unit (61) which detects a current flowing through the first chopper circuit (3a), wherein in the second mode, the operation controller (52) switches execution/suspension of the chopping operation of the first chopper circuit with a shorter period as the current is higher.

A seventh aspect of the control device for a switching power supply circuit according to the present invention is the control device for a switching power supply circuit according to the first or the second aspect, the control device further including: a temperature detection unit (81) which detects a temperature of the first chopper circuit (3a, 3b), wherein the operation controller (52) suspends, in the second mode, the chopping operation of the first chopper circuit on a condition that the temperature is greater than a predetermined value.

An eighth aspect of the control device for a switching power supply circuit according to the present invention is the control device for a switching power supply circuit according to the first or the second aspect, the control device further including: a first and a second temperature detection units (81, 82) which detect temperatures of the first and the second chopper circuits (3a, 3b), respectively, wherein the operation controller (52) suspends, in the second mode, the chopping operation of the first chopper circuit on a condition that a temperature of the first chopper circuit is greater than a temperature of the second chopper circuit by a value more than a predetermined value.

A ninth aspect of the control device for a switching power supply circuit according to the present invention is the control device for a switching power supply circuit according to the seventh or the eighth aspect, wherein the mode controller (51) shifts the operation mode to the first mode when in the second mode, the temperature is smaller than a second predetermined value which is smaller than the predetermined value.

A tenth aspect of the control device for a switching power supply circuit according to the present invention is the control device for a switching power supply circuit according to the first or the second aspect, the control device further including: a counter unit (90) which counts the number of chopping in the chopping operation of the first chopper circuit (3a, 3b), wherein the operation controller (52) suspends, in the second mode, the chopping operation of the first chopper circuit on a condition that the number since start of the chopping operation of the first chopper circuit is greater than a predetermined value.

An eleventh aspect of the control device for a switching power supply circuit according to the present invention is the control device for a switching power supply circuit according to any one of the first to the tenth aspects, the control device further including: a rectifier circuit (2) which rectifies an AC voltage and applies a DC voltage to the pair of input terminals; and a voltage detection unit (10) which detects the AC voltage or the DC voltage, wherein the operation controller (52) starts or suspends, in the second mode, the chopping operation of the first chopper circuit in a period when an absolute value of the AC voltage is lower than a predetermined value.

A twelfth aspect of the control device for a switching power supply circuit according to the present invention is the control device for a switching power supply circuit according to any one of the first to the eleventh aspects, the control device further including: a rectifier circuit (2) which rectifies an AC voltage and applies a DC voltage to the pair of input terminals; and a third current detection unit (13, 60, 61, 62) which detects an AC current flowing on an input side of the rectifier circuit or the input current, wherein the operation controller (52) starts or suspends, in the second mode, the chopping operation of the first chopper circuit in a period when an absolute value of the AC current is lower than a predetermined value.

A first aspect of a heat pump unit according to the present invention, including: the control device for a switching power supply circuit according to any one of the first to the twelfth aspects.

Effects of the Invention

In accordance with the first aspect of the control device for a switching power supply circuit according to the present invention, when the electric power is low and increase in temperature is relatively small, the first mode is employed. Thus, change in the input current associated with the switching between the chopping operation of the first chopper circuit and the chopping operation of the second chopper circuit can be reduced. In addition, when the electric power increases, the operation mode is switched from the case of the first mode to the second mode. Thus, in comparison with the first mode, in which only the first chopper circuit is made to perform the chopping operation, the increase in the temperature of the first chopper circuit can be reduced. As a result, decrease in the efficiency due to the increase in the temperature associated with the increase in the electric power can be reduced. When the electric power increases further, both of the first and the second chopper circuits perform the chopping operations. Furthermore, when the electric power is low, the switching loss of the switching element used for the chopping operation has a high percentage in the whole loss, and when the electric power is high, the conduction loss of the switching element has a high percentage. In the third mode, since the first and the second chopper circuits perform the chopping operations, the current flowing through each of the switching elements can be reduced, whereby the efficiency can be improved.

In accordance with the second aspect of the control device for a switching power supply circuit according to the present invention, when the input current increases, since the electric power which is input to the first and the second chopper circuits increases, the electric power in the first and the second chopper circuits increases. Accordingly, this contributes to the realization of the control device according to the first aspect.

In accordance with the third aspect of the control device for a switching power supply circuit according to the present invention, the first chopper circuit is made to perform or suspend the chopping operation, depending on a period of time. As a result, the chopping operation of the first chopper circuit can be performed or suspended by a low cost circuit, whereby increase in production cost can be reduced.

In accordance with the fourth aspect of the control device for a switching power supply circuit according to the present invention, since the temperature depends on the value of an integrated current, the temperature of the first chopper circuit can be controlled accurately compared with the third aspect.

In accordance with the fifth aspect of the control device for a switching power supply circuit according to the present invention, unnecessary switching of operation/suspension can be avoided.

In accordance with the sixth aspect of the control device for a switching power supply circuit according to the present invention, when a rising rate of temperature is estimated to be high, a period of the execution/suspension of the chopping operation of the first chopper circuit is short. As a result, the temperature rise can be controlled efficiently.

In accordance with the seventh aspect of the control device for a switching power supply circuit according to the present invention, the temperature of the first chopper circuit can be controlled accurately.

In accordance with the eighth aspect of the control device for a switching power supply circuit according to the present invention, heat can be dispersed efficiently.

In accordance with the ninth aspect of the control device for a switching power supply circuit according to the present invention, unnecessary switching of operation/suspension can be avoided.

The tenth aspect of the control device for a switching power supply circuit according to the present invention contributes to the realization of the control device according to the first aspect without using a temperature detection sensor. As a result, increase in production cost can be controlled.

In accordance with the eleventh aspect of the control device for a switching power supply circuit according to the present invention, when the absolute value of the AC voltage is small, the switching of operation/suspension of the first chopper circuit is performed. As a result, the variation of the AC voltage and the variation of the AC current can be reduced.

In accordance with the twelfth aspect of the control device for a switching power supply circuit according to the present invention, when the absolute value of the AC current is small, the switching of operation/suspension of the first chopper circuit is performed. As a result, the variation of the AC current can be reduced.

In accordance with the first aspect of the heat pump unit according to the present invention, a heat pump unit can be provided in which reduction of the efficiency of the first chopper circuit due to a temperature rise can be lowered.

An object, a feature, an aspect, and an advantage of the present invention will be made apparent by the following detailed description and the attached drawings.

BRIEF DESCRIPTION OF DRAWINGS

FIG. 3 is a diagram illustrating an example of a schematic configuration of a chopper circuit;
FIG. 4 is a diagram illustrating an example of a schematic configuration of a chopper circuit;
FIG. 5 is a diagram for illustrating an operation mode.

DESCRIPTION OF EMBODIMENTS

Figure 1:
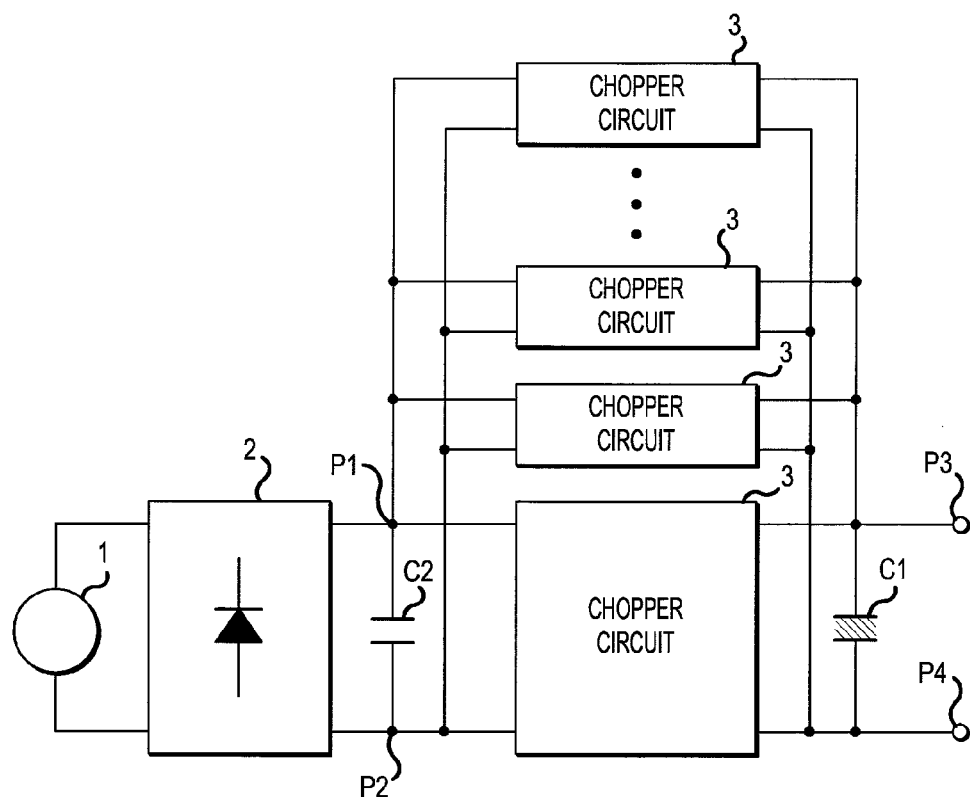
FIG. 1 is a diagram illustrating an example of a schematic configuration of a switching power supply circuit.

First Embodiment
<Switching Power Supply Circuit>
As exemplified in FIG. 1, a switching power supply circuit is equipped with a plurality of chopper circuits 3, input terminals P1 and P2, and output terminals P3 and P4.

Between the input terminals P1 and P2 is applied a first DC voltage. In the example of FIG. 1, a rectifier circuit 2 is connected to the input terminals P1 and P2. The rectifier circuit 2 rectifies an AC voltage from an AC power source 1 and applies a first DC voltage having been rectified, between the input terminals P1 and P2. Here, the potential applied to the input terminal P2 is lower than the potential applied to the input terminal P1. Note that connecting the rectifier circuit 2 to the input terminals P1 and P2 is not an essential condition. An arbitrary configuration for applying the first DC voltage between the input terminals P1 and P2 only has to be connected to the input terminals P1 and P2.

The plurality of chopper circuits 3 are connected parallel to each other between the pair of input terminals P1 and P2 and the pair of output terminals P3 and P4, and each perform a chopping operation. By this chopping operation, each chopper circuit 3 changes the first DC voltage between the input terminals P1 and P2, and applies this between the output terminals P3 and P4 as the second DC voltage. A detailed configuration about the chopper circuit 3 will be described latter.

Between the output terminals P3 and P4 is provided a smoothing capacitor C1. The smoothing capacitor C1 smoothes the second DC voltage from the chopper circuits 3.

Alternatively, as exemplified in FIG. 1, between the input terminals P1 and P2 may be provided a capacitor C2. The capacitor C2 can reduce noise in the current which is input into the chopper circuits 3.

Figure 2:
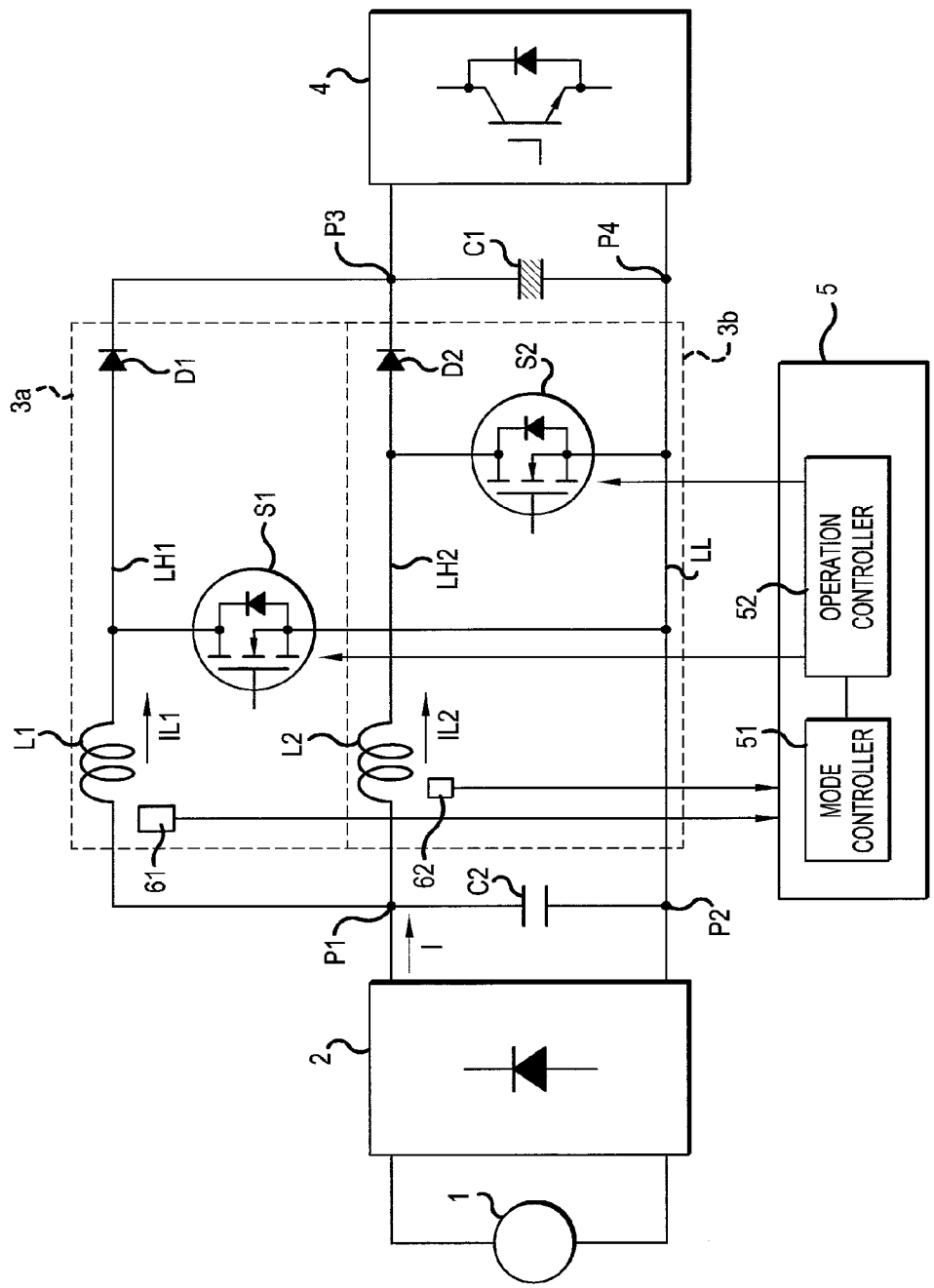
FIG. 2 is a diagram illustrating an example of a schematic configuration of a switching power supply circuit.

The chopper circuit 3 is a step-up chopper circuit, for example. In FIG. 2, as the plurality of chopper circuits 3, two chopper circuits 3a and 3b are shown. Note that in the example in FIG. 2, an inverter 4 is connected to the output terminals P3 and P4. However, other than this, an arbitrary load to which a DC voltage is supplied can be connected to the output terminals P3 and P4.

In the example in FIG. 2, the chopper circuit 3a is equipped with a switching element S1, a reactor L1, and a diode D1. The reactor L1 and the diode D1 are connected in series to each other on a DC line LH1 connecting the input terminal P1 and the output terminal P3. The reactor L1 is disposed on the input terminal P1 side of the diode D1. The diode D1 is disposed with the anode thereof directed to the input terminal P1 side. The switching element S1 is, for example, a MOS electric field effect transistor, an insulated gate bipolar transistor, or the like, and is provided between a connection point connecting the reactor L1 and the diode D1 and a DC line LL connecting the input terminal P2 and the output terminal P4.

Next, the chopping operation of the chopper circuit 3a will be described. In this chopping operation, the on/off of the switching element S1 is repeatedly switched. Here, when the switching element S1 is turned on, a current flows from the input terminal P1 to the input terminal P2 through the reactor L1 and the switching element S1. At this time, electromagnetic energy is accumulated in the reactor L1. When the switching element S1 is turned off, a current flows from the input terminal P1 to the input terminal P2 through the reactor L1, the diode D1, and the smoothing capacitor C1. At this time, to the smoothing capacitor C1, the second DC voltage which is obtained by adding the first DC voltage between the input terminals P1 and P2 to an inductive voltage generated in the reactor L1 is applied. Thus, to the smoothing capacitor C1 is applied the second DC voltage which is higher than the first DC voltage.

The chopper circuit 3b is equipped with a switching element S2, a reactor L2, and a diode D2. The reactor L2 and the diode D2 are connected in series to each other on the DC line LH2 connecting the input terminal P1 and the output terminal P3. The reactor L2 is disposed on the input terminal P1 side of the diode D2. The diode D2 is disposed with the anode thereof directed to the input terminal P1 side. The switching element S2 is, for example, a MOS electric field effect transistor, an insulated gate bipolar transistor, or the like, and is disposed between the connection point connecting the reactor L2 and the diode D2 and the DC line LL.

Since the operation of the chopper circuit 3b is similar to the chopper circuit 3a, a detailed description will not be made.

With these chopper circuits 3a and 3b, even when the switching elements S1 and S2 are on, a current flows through the input terminals P1 and P2; thus, a conduction angle of the AC current which is input to the rectifier circuit 2 can be enlarged. Therefore, a power factor on the input side (hereinafter, also referred to as "input power factor") can be improved. To put it in other words, the switching power supply circuit functions as a power factor correct circuit (Power Factor Correct Circuit).

Note that the chopper circuit 3 does not have to be a step-up chopper circuit. For example, as exemplified in FIG. 3, a step-down chopper circuit may be possible. In this step-down chopper circuit, a switching element S1 and a reactor L1 are connected in series to each other on the DC line connecting the input terminal P1 and the output terminal P3. The switching element S1 is disposed on the input terminal P1 side of the reactor L1. A diode D1 is provided between the connection point connecting the switching element S1 and the reactor L1 and the DC line LL connecting the input terminal P2 and the output terminal P3. The diode D1 is disposed with the anode thereof directed to the DC line LL side.

Also in the chopping operation of this chopper circuit 3, the on/off of the switching element S1 is repeatedly switched. When the switching element S1 is on, the current flows from the input terminal P1 to the input terminal P2 through the switching element S1, the reactor L1, and the smoothing capacitor C1. At this time, since the inductive voltage generated in the reactor L1 has higher potential on the input terminal side, to the smoothing capacitor C1 is applied a voltage which is obtained by subtracting the inductive voltage from the first DC voltage between the input terminals P1 and P2. When the switching element S1 is turned off, the current flows through the reactor L1, the smoothing capacitor C1, and the diode D1.

By the above operation, the chopper circuit 3 can step down the first DC voltage and outputs this as the second DC voltage. In addition, in the period when the switching element S1 is on, the current flows through the input terminals P1 and P2, whereby the conduction angle of the current can be enlarged. However, employing the chopper circuit 3 of FIG. 2 can further reduce high-frequency components of the current flowing through the input terminals P1 and P2. This is due to the fact that in the chopper circuit 3 of FIG. 2, the current flows through the input terminals P1 and P2 regardless of the on/off of the switching element S1. Therefore, from the point of view of reducing the high-frequency components of the current, it is preferable to employ the chopper circuit 3 of FIG. 2.

Alternatively, the chopper circuit 3 may be a step-up/down chopper circuit as exemplified in FIG. 4. In the step-up/down chopper circuit, a switching element S1 and a diode D1 are connected in series to each other on the DC line connecting the input terminal P1 and the output terminal P3. The switching element S1 is disposed on the input terminal P1 side of the diode D1. The diode D1 is disposed with the anode thereof directed to the output terminal P3. A reactor L1 is provided between the connection point connecting the switching element S1 and the diode D1 and the DC line LL connecting the input terminal P2 and the output terminal P4.

Also in the chopping operation of the chopper circuit 3, the on/off of the switching element S1 is repeatedly switched. When the switching element S1 is on, the current flows from the input terminal P1 to the input terminal P2 through the switching element S1 and the reactor L1. This makes electromagnetic energy be accumulated in the reactor L1. When the switching element S1 is turned off, the inductive voltage generated in the reactor L1 functions as a power source, and the current flows through the smoothing capacitor C1 and the diode D1. As the on-period of the switching element S1 is made longer, a higher voltage is applied to the smoothing capacitor C1.

By adjusting the on-period of the switching element S1, the chopper circuit 3 can step up or step down the first DC voltage. In addition, in the period when the switching element S1 is on, the current flows through the input terminals P1 and P2, whereby the conduction angle of the current can be enlarged. However, employing the chopper circuit 3 of FIG. 2 can further reduce the high-frequency components of the current flowing through the input terminals P1 and P2. This is due to the fact that in the chopper circuit 3 of FIG. 2, the current flows through the input terminals P1 and P2 regardless of the on/off of the switching element S1. Therefore, from the point of view of reducing the high-frequency components of the current, it is preferable to employ the chopper circuit 3 of FIG. 2.

Below, a description will be made for the case that a step-up chopper circuit is employed as the chopper circuit 3, and the description will be made for the case that two chopper circuits 3 are provided.

The switching elements S1 and S2 of the chopper circuits 3a and 3b are controlled by the controller 5. The controller 5 is equipped with a mode controller 51 and an operation controller 52. The mode controller 51 instructs the operation controller 52 to select the following modes M1-M3 as the operation modes of the chopper circuits 3a and 3b.

In the mode M1, as exemplified in FIG. 5, the operation controller 52 causes any one of the chopper circuits 3a and 3b to constantly perform the chopping operation. For example, the operation controller 52 repeatedly switches the on/off of the switching element 51 to make the chopper circuit 3a constantly perform the chopping operation, and makes the switching element S2 be constantly off to suspend the chopping operation of the chopper circuit 3b.

Figure 6:
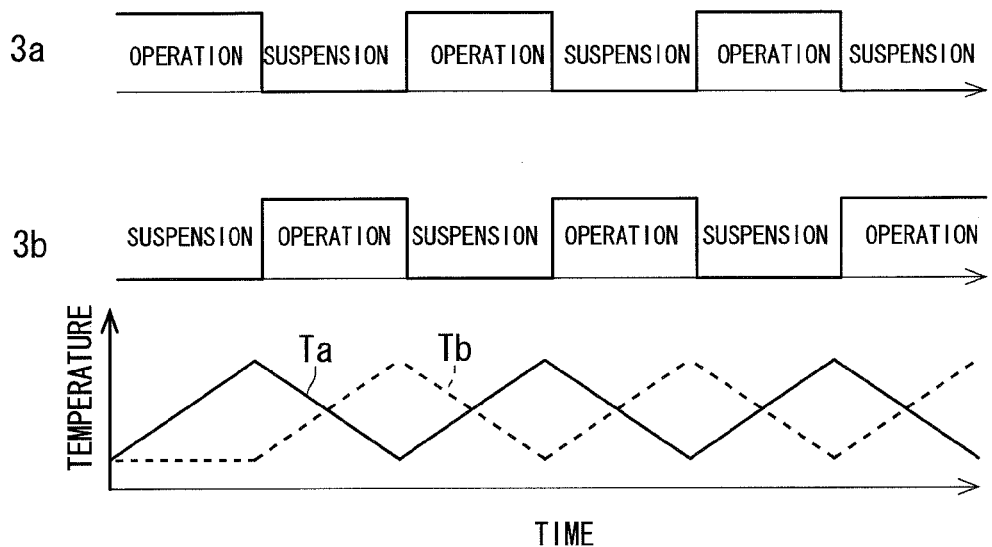
FIG. 6 is a diagram for illustrating an operation mode.

In the mode M2, as exemplified in FIG. 6, the operation controller 52 causes the chopper circuits 3a and 3b to alternately perform the chopping operation. In the example of FIG. 6, the timings of switching the execution/suspension of the chopping operations of the chopper circuits 3a and 3b are identical with each other; however, the timings may be different from each other.

Figure 7:
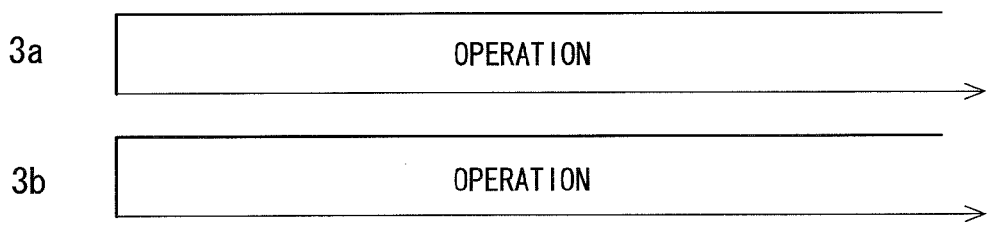
FIG. 7 is a diagram for illustrating an operation mode.
Figure 8:
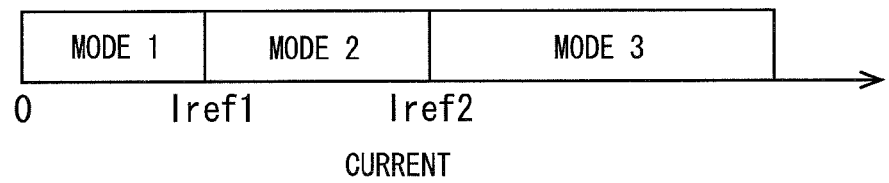
FIG. 8 is a diagram for illustrating changes of the operation modes.

In the mode M3, as exemplified in FIG. 7, the operation controller 52 causes both of the chopper circuits 3a and 3b to constantly perform the chopping operations. At this time, it is preferable for the operation controller 52 to control the switching elements S1 and S2 such that the on-periods of the switching elements S1 and S2 are out of synchronization. In more detail, for example, the timing of the start (turn-on) and the end (turn-off) of the on-period of the switching element S2 are made to be delayed, by half the period of the switching period, with respect to the timing of the start and the end of the on-period of the switching element 51. Such a control is well known as described in Mamoru Kitamura, "Creating a 1.5 kW Low-Noise Power Supply with High Harmonic Suppression—The R2A20112 Critical Conduction Mode/Interleaving PFC IC", Transistor Gijutsu, May 2008 Issue, CQ Publishing Co., Ltd, Aug. 2008, pp. 176-184, whereby a detailed description will be omitted. By this, the high-frequency components of the current flowing through the input terminals P1 and P2 can be reduced. Such a control is also referred to as, so to speak, interleave.

The mode controller 51 selects the above-described modes M1-M3 in the following way. That is, the mode controller 51 shifts the operation modes of the chopper circuits 3a and 3b from the mode M1 through the mode M2 to the mode M3 as the electric power of the chopper circuits 3a and 3b increases.

In the embodiment, as the electric power, an input current I flowing through the input terminals P1 and P2 is detected, for example. The validity of this will be described below. In the example of FIG. 2, the first DC voltage applied to the input terminals P1 and P2 is a voltage obtained by rectifying the AC voltage of the AC power source 1. Since the amplitude and the period of the AC voltage can be considered constant, the amplitude and the period of the pulsation of the first DC voltage can be also considered constant. Thus, an average value of the first DC voltage is constant for one period of the AC voltage, for example. Therefore, the first DC voltage can be considered to be a constant-voltage source having a ripple.

On the other hand, the AC current flowing on the input side of the rectifier circuit 2 has a sine wave shape ideally, whereby the input current I has a half-wave shape (the shape of the absolute value of a sine wave), ideally. The first DC voltage is a constant-voltage source; thus, as the amplitude of the input current I increases, the electric power which is input to the chopper circuits 3a and 3b increases. Thus, by detecting the input current I, the electric power in the chopper circuits 3a and 3b can be identified.

In the example of FIG. 2, there are provided current detection units 61 and 62, each of which detects each of currents IL1 and IL2 flowing through the reactors L1 and L2. Detection values of the current detection units 61 and 62 are output to the controller 5. The controller 5 adds up the detection values of the current detection units 61 and 62 to obtain the input current I.

Then, as exemplified in FIG. 6, the mode controller 51 employs: the mode M1 when the amplitude of the input current I is smaller than a predetermined value Iref1; the mode M2 when the amplitude of the input current I is greater than the predetermined value Iref1 and smaller than a predetermined value Iref2; and the mode M3 when the amplitude of the input current I is greater than predetermined value Iref2. Note that, the amplitude of the input current I is not necessarily obtained, and an average value or a maximum value of the input current I for about one period of the AC voltage may be obtained, and the modes M1 to M3 may be employed in accordance with this.

In accordance with the above operation of switching the modes, when the electric power in the chopper circuits 3a and 3b is low, and the increase in the temperature of the chopper circuits 3a and 3b is relatively low, the mode M1 is employed. This makes it possible to control change in the input current I associated with the switching between the chopping operation of the chopper circuit 3a and the chopping operation of the chopper circuit 3b.

In addition, when the electric power is low, a percentage of the switching loss in the loss created in the switching power supply circuit is large. Thus, when the electric power is low, by making only the chopper circuit 3a perform the chopping operation, the efficiency can be improved.

Further, when the electric power in the chopper circuits 3a and 3b increases, the mode M2 is employed. At this time, as exemplified in FIG. 6, the temperature Ta of the chopper circuit 3a increases in the period when the chopper circuit 3a operates, and decreases in the period when the chopper circuit 3a is suspended. Thus, the temperature Ta of the chopper circuit 3a can be lower than that in the case that only the chopper circuit 3a is operated. Similarly, the temperature Tb of the chopper circuit 3b can also be reduced. The temperature rises of the chopper circuits 3a and 3b increase the conduction losses of the switching elements S1 and S2, respectively; therefore, the efficiency of the switching power supply circuit can be improved.

When the electric power in the chopper circuits 3a and 3b further increases, the mode M3 is employed. In the mode M3, both of the chopper circuits 3a and 3b perform the chopping operations. By this, the current flowing through the switching elements S1 and S2 can be reduced. This is because the current having been flowing through only any one of the switching elements S1 and S2 in the mode M2 can be shared by the switching elements S1 and S2 in the mode M3. Thus, when the electric power is large, the percentage of the conduction loss in the loss created in the switching power supply circuit is large; therefore, by reducing the current flowing through the switching elements S1 and S2, the efficiency can be improved.

In addition, in the mode M3, the chopper circuits 3a and 3b can be made to perform the chopping operations by the interleave method. This can reduce the high-frequency components of the input current I.

Note that it is not necessary to provide two current detection units 61 and 62, and one current detection unit for detecting an input current I flowing through the input terminal P1 or the input terminal P2 may be provided.

These current detection units can be used for the purposes to be described below. For example, it is possible to detect an overcurrent flowing through the chopper circuits 3a and 3b. Thus, the connection to the AC power source may be cut upon the detection of such overcurrent. Such cutting can be realized by, for example, providing a switch between the AC power source and the rectifier circuit 2 and turning off the switch.

Alternatively, when the current detection units 61 and 62 are provided, these current detection units 61 and 62 can be used for the following purpose. That is, in a critical current mode in which the on/off of the switching elements S1 and S2 is switched at the state where the currents IL1 and IL2 are each zero, the current detection units 61 and 62 can be used to detect the state where currents IL1 and IL2 become zero.

In the case that the current detection unit can be used for other purposes as described above, it is not necessary to newly provide a current detection unit, and an increase in production cost can be controlled.

Second Embodiment

Figure 9:
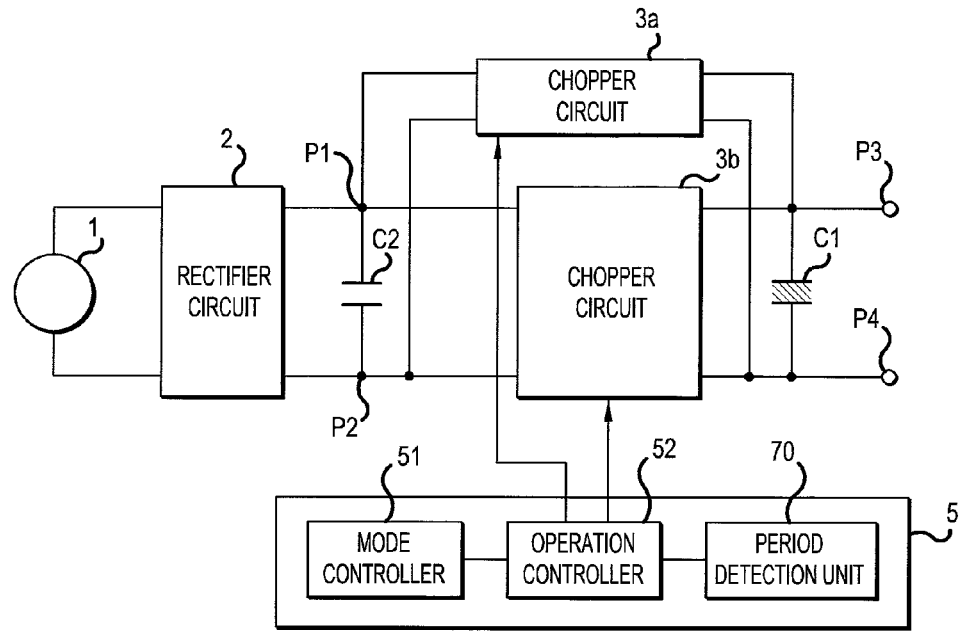
FIG. 9 is a diagram illustrating an example of a schematic configuration of a switching power supply circuit.

In the second embodiment, a description will be made on an example of a condition on which the chopping operations of the chopper circuits 3a and 3b are switched in the mode M2. In the second embodiment, the chopping operations of the chopper circuits 3a and 3b are switched every predetermined period of time. In the example in FIG. 9, the switching power supply circuit is further equipped with a period detection unit 70. The period detection unit 70 detects, for example, that a predetermined reference period has elapsed since the start of operation of each of the chopper circuits 3a and 3b. For example, the period detection unit 70 has a timer circuit and a determination unit. The timer circuit is initialized by the operation controller 52 when each of the chopper circuits 3a and 3b starts to operate. The determination unit determines whether an elapsed time counted by the timer circuit is longer than the reference period, and if a positive determination is made, the determination unit informs the operation controller 52 accordingly.

On the condition that the elapsed time since the start of operation of the chopper circuit 3a is longer than the reference period, the operation controller 52 suspends the chopping operation of the chopper circuit 3a and makes the chopper circuit 3b perform the chopping operation. Note that the suspension of operation of the chopper circuit 3a and the start of operation of the chopper circuit 3b may be simultaneously performed, or either one may be performed sooner. However, it is preferable that the suspension of operation of one of the chopper circuits 3a and 3b is performed at the same time as or after the start of operation of the other. This can avoid the period at which neither of the chopper circuits 3a and 3b performs the chopping operation. Since the input power factor decreases in the period when neither of the chopper circuits 3a and 3b performs the chopping operation, such a decrease in the input power factor can be controlled. Note that since the switching of the chopping operations of the chopper circuits 3a and 3b is the same as in other embodiments to be described later, the description thereof will be omitted.

Figure 10:
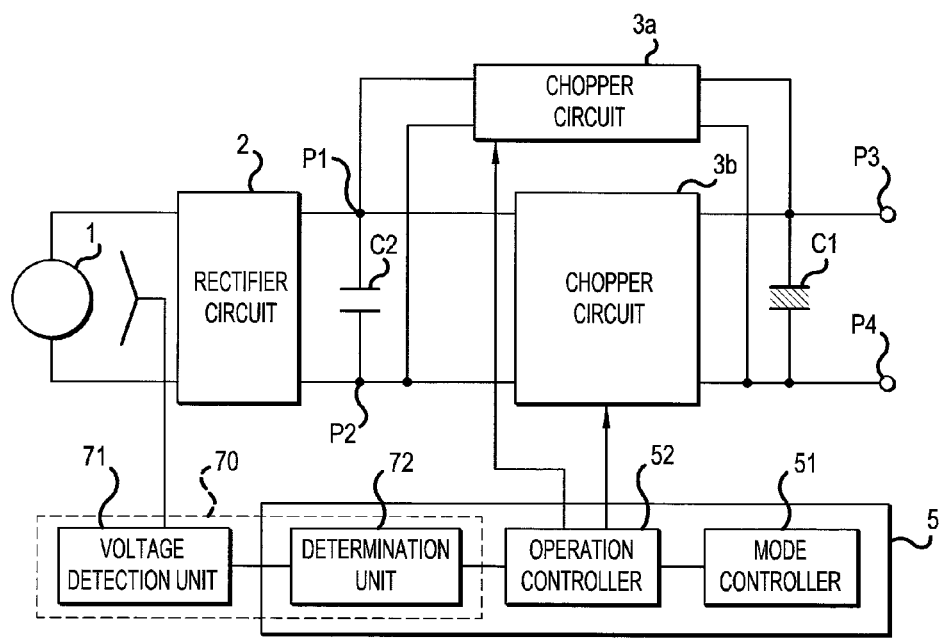
FIG. 10 is a diagram illustrating an example of a schematic configuration of a switching power supply circuit.

Further, the timer circuit is used to count the elapsed time in the above example; however, other configurations may be possible. As exemplified in FIG. 10, the period detection unit 70 may be equipped with a voltage detection unit 71 and a determination unit 72. The voltage detection unit 71 detects, for example, the AC voltage of the input side of the rectifier circuit 2. The determination unit 72 determines whether such AC voltage becomes a predetermined standard voltage value (for example, zero), and if a positive determination is made, the determination unit 72 informs the operation controller 52 accordingly. The operation controller 52 may switch the chopping operations of the chopper circuits 3a and 3b when such AC voltage becomes the standard voltage value. For example, if zero is employed as the standard voltage value, the chopping operations of the chopper circuits 3a and 3b can be switched every half the period of the AC voltage. In other words, as the reference period, half the period of the AC voltage can be employed.

Alternatively, instead of the AC voltage of the input side of the rectifier circuit 2, the voltage detection unit 71 may detect the first DC voltage of the output side of the rectifier circuit 2. Since the first DC voltage pulsates with a period of an N-th part of the period of an N-phase (N is a natural number) AC voltage, the period of the AC voltage can be obtained from the first DC voltage. Note that in the case of N=2, the N phase AC voltage is a single phase AC voltage. The determination unit 72 determines whether such first DC voltage becomes a predetermined second standard voltage value, and if a positive determination is made, the determination unit 72 informs the operation controller 52 accordingly. When the first DC voltage becomes the second standard voltage value, the operation controller 52 switches the chopping operations of the chopper circuits 3a and 3b. Then, if the peak or the bottom of the first DC voltage, for example, is employed as the second standard voltage value, the chopping operations of the chopper circuits 3a and 3b can be switched every N-th part of the period of the N-phase AC voltage. In other words, as the reference period, the N-th part of the period of the AC voltage can be employed.

Third Embodiment

In the third embodiment, a description will be made on an example of a condition on which the chopping operations of the chopper circuits 3a and 3b are switched in the mode M2. In the example in FIG. 11, the switching power supply circuit is equipped with two current detection units 61 and 62. The current detection units 61 and 62 detect the current flowing through the chopper circuits 3a and 3b. In the example in FIG. 11, the current detection units 61 and 62 detect the currents IL1 and IL2 flowing through the reactor L1 and L2.

The controller 5 is further equipped with a current integration unit 63 and a determination unit 64. The current integration unit 63 integrates the currents IL1 and IL2 from the start of operation of the chopper circuits 3a and 3b. The determination unit 64 determines whether the value of the integrated current is greater than a predetermined standard integration value, and if a positive determination is made, the determination unit 64 informs the operation controller 52 accordingly.

On the condition that the value of the current IL1 having been integrated from the start of the chopping operation of the chopper circuit 3a is greater than the standard integration value, the operation controller 52 suspends the chopping operation of the chopper circuit 3a and makes the chopper circuit 3b perform the chopping operation. Further, the current integration unit 63 initializes the integration value of the current IL1 to be zero in accordance with the suspension of the chopping operation of the chopper circuit 3a. Similarly, on the condition that the value of the current IL2 having been integrated from the start of operation of the chopper circuit 3b is greater than the standard integration value, the operation controller 52 suspends the chopping operation of the chopper circuit 3b and makes the chopper circuit 3a perform the chopping operation. In addition, the current integration unit 63 initializes the integration value of the current IL2 to be zero in accordance with the suspension of the chopping operation of the chopper circuit 3b.

Here, the temperature rise in the chopper circuits 3a and 3b occurs due to Joule heat and the like. Thus, the temperature rise in the chopper circuits 3a and 3b depends on an integration value of Joule heat with respect to time. On the other hand, the Joule heat created in the chopper circuit 3a depends on the current flowing through the chopper circuit 3a. As a result, the temperature rise in the chopper circuit 3a depends on the integration value with respect to time of the current flowing through the chopper circuit 3a.

In accordance with the present control method, the operations of the chopper circuits 3a and 3b are switched depending on the value of the integrated current, whereby the temperatures of the chopper circuits 3a and 3b can be controlled relatively precisely.

Figure 12:
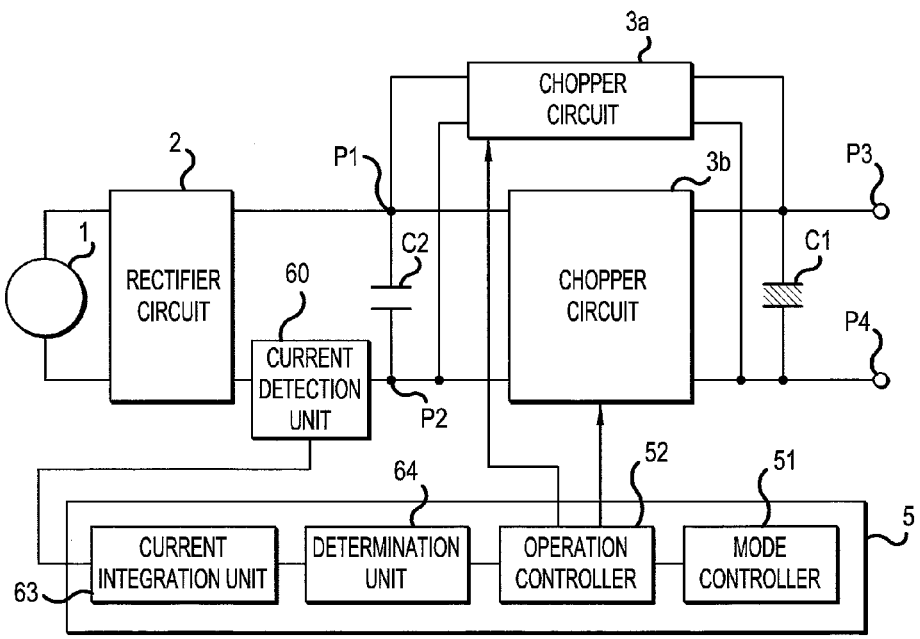
FIG. 12 is a diagram illustrating an example of a schematic configuration of a switching power supply circuit.

Note that the current detection unit does not have to be provided in accordance with the number of the chopper circuits 3a and 3b. In the example in FIG. 12, one current detection unit 60 is provided, and the current detection unit 60 detects the current flowing through the input terminal P2. Note that the current detection unit 60 may detect the current flowing through the input terminal P1.

The current integration unit 63 integrates the current detected by the current detection unit 60. Then, every time the integration value exceeds the standard integration value, the operation controller 52 only has to switch the chopping operations of the chopper circuits 3a and 3b and initialize the integration value to be zero.

Note that these current detection units 60, 61, and 62 may be used to detect the overcurrent flowing through the chopper circuits 3a and 3b as described in the first embodiment, and the current detection units 61 and 62 may be used to make the chopper circuits 3a and 3b perform the chopping operations in the critical current mode. As described above, in the case that the current detection units 60, 61, and 62 can be used for other purposes, a current detection unit does not need to be newly provided, whereby a rise in production cost can be controlled.

On the condition that in the mode M2, the amplitude (or, for example, the average value or the maximum value of the AC voltage for about one period; this applies hereinafter) of the current detected by any of the current detection units 60, 61, and 62 is smaller than the predetermined value, the mode controller 51 may switch the operation mode to the mode M1. This can avoid unnecessary switching between the chopper circuits 3a and 3b in the case that the current is low and the temperature rise is small.

It is preferable that the operation controller 52 controls such that, for example, as the amplitude of the current detected by the current detection units 60, 61, and 62 is larger, the chopping operations of the chopper circuits 3a and 3b are switched with a shorter period. In other words, it is preferable that as the current is larger, the execution/suspension of the chopping operation of the chopper circuit 3a is switched with a shorter period. This is because that as the current is larger, the increase rates of the temperatures in the chopper circuits 3a and 3b are higher; thus, by making the switching period shorter for the larger current, the temperatures of the chopper circuits 3a and 3b can be more appropriately controlled.

Here, in the third embodiment, when the value of the integrated current is greater than the standard integration value, the chopping operations are switched. For a larger current, the integration value exceeds the standard integration value in a shorter period; thus, for the larger current, the chopping operations of the chopper circuits 3a and 3b are switched with a shorter period. Therefore, also by this control method, the temperatures of the chopper circuits 3a and 3b can be appropriately controlled.

Alternatively, for example, in the case that the chopping operations are switched according to the time having elapsed since the start of the chopping operation as in the second embodiment, it is preferable that a reference time is made shorter for the larger amplitude of the detected current. By this, the temperatures of the chopper circuits 3a and 3b can be appropriately controlled.

Fourth Embodiment

Figure 13:
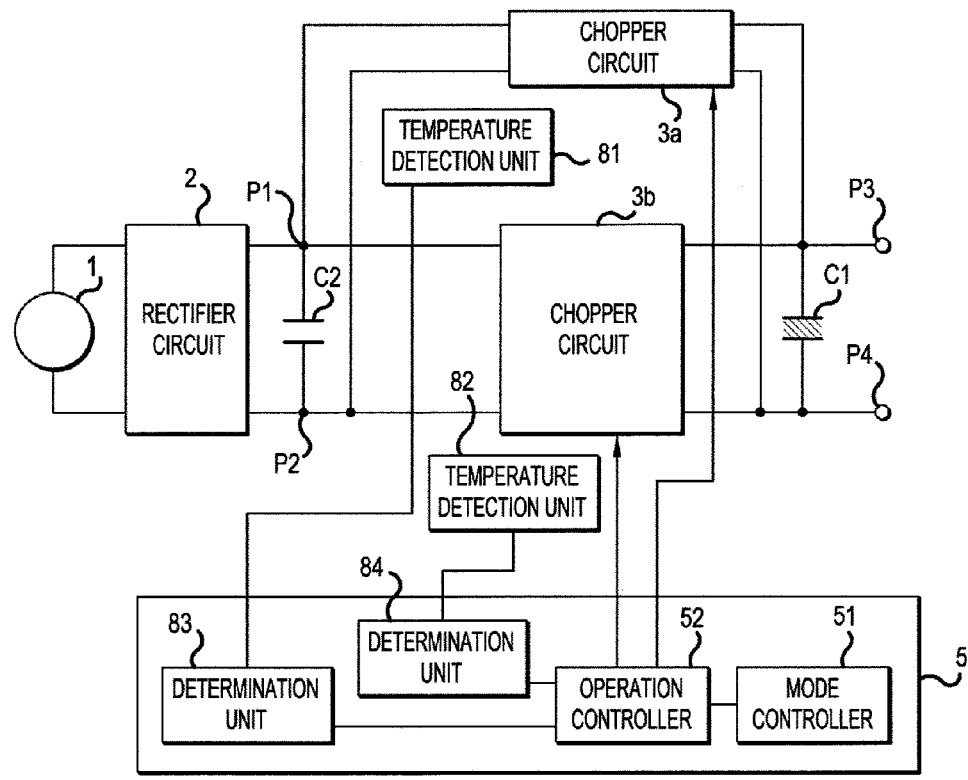
FIG. 13 is a diagram illustrating an example of a schematic configuration of a switching power supply circuit.

In the fourth embodiment, a description will be made on an example of a condition on which the chopping operations of the chopper circuits 3a and 3b are switched in the mode M2. In the example in FIG. 13, the switching power supply circuit is further equipped with two temperature detection units 81 and 82. The temperature detection unit 81 detects the temperature of the chopper circuit 3a, and the temperature detection unit 82 detects the temperature of the chopper circuit 3b.

The controller 5 is further equipped with determination units 83 and 84. The determination unit 83 determines whether the temperature detected by the temperature detection unit 81 is greater than a predetermined standard temperature value, and if a positive determination is made, the determination unit 83 informs the operation controller 52 accordingly. The determination unit 84 determines whether the temperature detected by the temperature detection unit 82 is greater than the standard temperature value, and if a positive determination is made, the determination unit 84 informs the operation controller 52 accordingly.

On a condition that the temperature of the chopper circuit 3a is greater than the standard temperature value, the operation controller 52 suspends the chopping operation of the chopper circuit 3a and makes the chopper circuit 3b perform the chopping operation. Further, on a condition that the temperature of the chopper circuit 3b is greater than the standard temperature value, the operation controller 52 suspends the chopping operation of the chopper circuit 3b and makes the chopper circuit 3a perform the chopping operation.

This can precisely keep the temperatures of the chopper circuits 3a and 3b to be equal to or lower than the standard temperature value.

In addition, the temperature detection units do not have to be provided depending on the number of the chopper circuits 3a and 3b. For example, with respect to the two chopper circuits 3a and 3b, one temperature detection unit may be provided. This temperature detection unit detects an average temperature of the chopper circuits 3a and 3b. Then, on a condition that the temperature detected by this temperature detection unit is larger than a second standard temperature value, the operation controller 52 may switch the chopping operations of the chopper circuits 3a and 3b.

Figure 14:
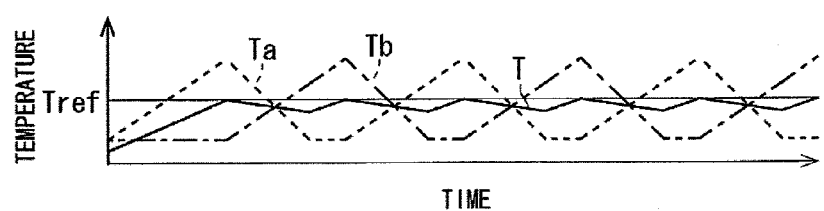
FIG. 14 is a diagram illustrating an example of a temperature of a chopper circuit.

For example, as illustrated in FIG. 14, along with a rise of the temperature Ta of the chopper circuit 3a, the temperature T detected by the temperature detection unit increases. Then, when the temperature T detected by the temperature detection unit exceeds a second standard temperature value Tref, the operation controller 52 suspends the chopping operation of the chopper circuit 3a and makes the chopper circuit 3b perform the chopping operation. In accordance with this, the temperature Ta of the chopper circuit 3a decreases, and the temperature Tb of the chopper circuit 3b increases.

At this time, when a decrease rate of the temperature Ta of the chopper circuit 3a is higher than the increase rate of the temperature Tb of the chopper circuit 3b, the temperature T detected by the temperature detection unit decreases. Then, when the decrease rate of the temperature Ta of the chopper circuit 3a falls below the increase rate of the temperature Tb of the chopper circuit 3b, the temperature T detected by the temperature detection unit turns upward. After that, when the temperature T detected by the temperature detection unit becomes again greater than the second standard temperature value Tref, the operation controller 52 suspends the chopping operation of the chopper circuit 3b and makes the chopper circuit 3a perform the chopping operation.

At this time, when the decrease rate of the temperature Tb of the chopper circuit 3b is higher than the increase rate of the temperature Ta of the chopper circuit 3a, the temperature T detected by the temperature detection unit decreases. Then, when the decrease rate of the temperature Tb of the chopper circuit 3b falls below the increase rate of the temperature Ta of the chopper circuit 3a, the temperature T detected by the temperature detection unit turns upward. After that, when the temperature T detected by the temperature detection unit becomes again greater than the second standard temperature value Tref, the operation controller 52 again suspends the chopping operation of the chopper circuit 3a and makes the chopper circuit 3b perform the chopping operation. Hereinafter, the above-described operation will be repeated.

The switching of the chopping operation like this can also control the rise in the temperature of the chopper circuits 3a and 3b.

Figure 15:
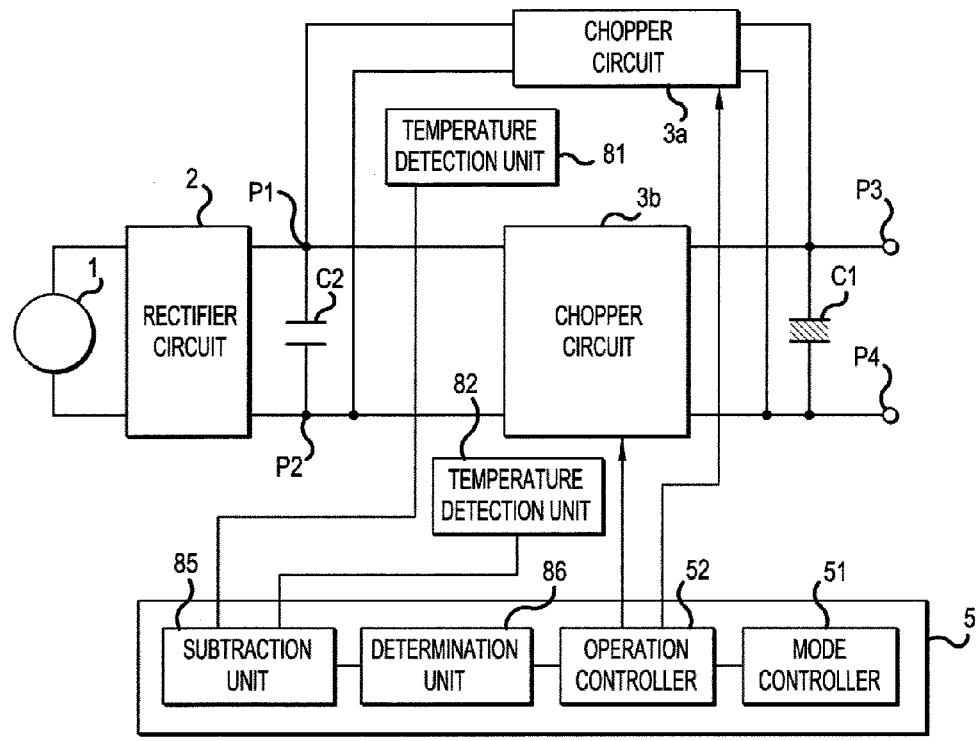
FIG. 15 is a diagram illustrating an example of a schematic configuration of a switching power supply circuit.

Further, as exemplified in FIG. 15, the controller 5 may be equipped with a subtraction unit 85 and a determination unit 86. The subtraction unit 85 calculates an absolute value of the difference between the temperatures detected by the temperature detection units 81 and 82. The determination unit 86 determines whether the absolute value of the difference between the temperatures is greater than a predetermined standard temperature difference value, and if a positive determination is made, the determination unit 86 informs the operation controller 52 accordingly.

Figure 16:
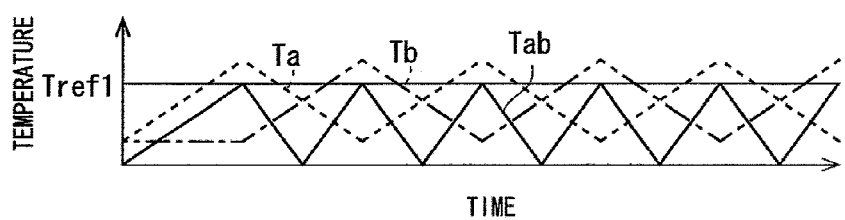
FIG. 16 is a diagram illustrating an example of a temperature of a chopper circuit.

On a condition that the absolute value of the difference between the temperatures detected by the temperature detection units 81 and 82 is greater than the standard temperature difference value, the operation controller 52 switches the chopping operations of the chopper circuits 3a and 3b. For example, as illustrated in FIG. 16, along with a rise of the temperature Ta of the chopper circuit 3a, the temperature difference Tab, which is the absolute value of the difference between the temperatures Ta and Tb, increases. When the temperature difference Tab becomes greater than the standard temperature difference value Tref1, the chopping operation of the chopper circuit 3a is made to suspend, and the chopper circuit 3b is made to perform the chopping operation. In association with this, the temperature Ta decreases, and the temperature Tb increases. As a result, the temperature difference Tab decreases. Then, after the temperatures Ta and Tb becomes equal to each other and the temperature difference Tab becomes zero, the temperature difference Tab again turns upward. Then, when the temperature difference Tab again becomes greater than the standard temperature difference value Tref1, the chopping operation of the chopper circuit 3b is made to suspend, and the chopper circuit 3a is made to perform the chopping operation.

By this, the amount of heat created in the chopper circuits 3a and 3b can be shared between the chopper circuits 3a and 3b in a good balance. As a result, the temperatures of the chopper circuits 3a and 3b can be controlled more appropriately and efficiently.

In addition, also to the mode controller 51, the temperatures detected by the temperature detection units 81 and 82 can be input. Then, when the temperature detected in the mode M2 is smaller than a third standard temperature value (<the standard temperature value, the second standard temperature value), the mode controller 51 may switch the operation mode to the mode M1. This can avoid unnecessary switching of the chopping operations of the chopper circuits 3a and 3b.

Fifth Embodiment

Figure 17:
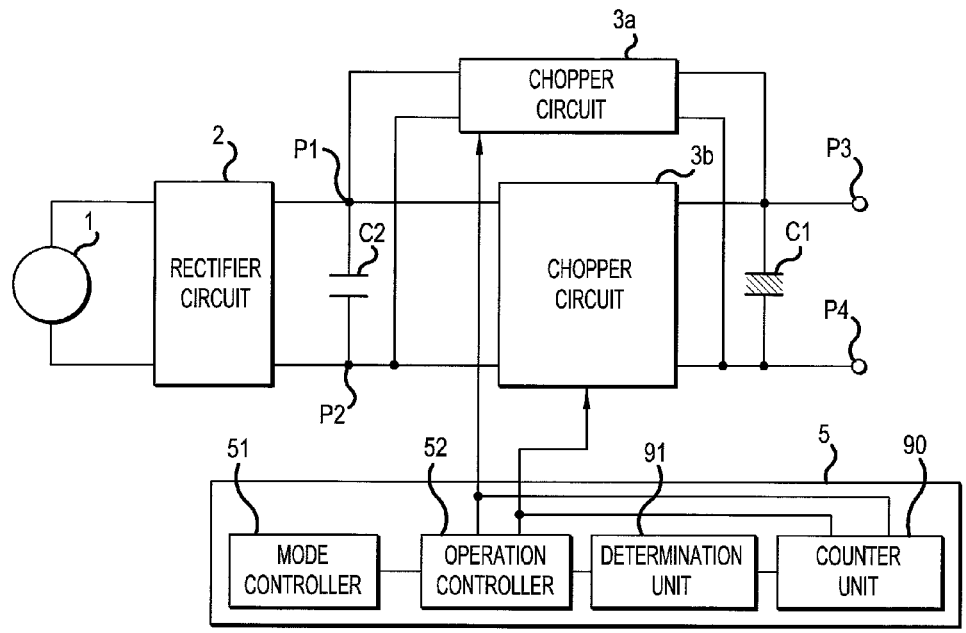
FIG. 17 is a diagram illustrating an example of a schematic configuration of a switching power supply circuit.

In the fifth embodiment, a description will be made on an example of a condition on which the chopping operations of the chopper circuits 3a and 3b are switched in the mode M2. In the example in FIG. 17, the switching power supply circuit is equipped with a counter unit 90 and a determination unit 91. The counter unit 90 counts the number of chopping of the chopping operations of the chopper circuits 3a and 3b. In more detail, to the counter unit 90, switching signals to the switching elements S1 and S2 are input. Then, the counter unit 90 counts the number of inputs of the switching signals.

The determination unit 91 determines whether the number of chopping counted by the counter unit 90 is greater than a predetermined standard value of number, and if a positive determination is made, the determination unit 91 informs the operation controller 52 accordingly.

When the number of chopping since the start of operation of the chopper circuit 3a is greater than the standard value of number, the operation controller 52 suspends the chopping operation of the chopper circuit 3a and makes the chopper circuit 3b perform the chopping operation. In addition, the counter unit 90 initializes the number of chopping upon the start of operation of the chopper circuit 3b. Then, when the number of chopping since the start of operation of the chopper circuit 3b is greater than the standard value of number, the operation controller 52 suspends the chopping operation of the chopper circuit 3b and makes the chopper circuit 3a perform the chopping operation. In addition, the counter unit 90 initializes the number of chopping upon the start of operation of the chopper circuit 3a.

This can also control the rise in the temperatures of the chopper circuits 3a and 3b. In addition, an expensive sensor such as a temperature sensor is not required, whereby production cost can be reduced.

Note that the standard value of number is preferably smaller for the larger amplitude (or, for example, the average value or the maximum value of the AC voltage for about one period; this applies hereinafter) of the currents flowing through the chopper circuits 3a and 3b. This is the same as described in the third embodiment.

Sixth Embodiment

In the mode M2, as the condition for switching the chopper circuits 3a and 3b, any of the conditions described in the second to fifth embodiments is employed, for example. However, the operation controller 52 switches the chopping operations of the chopper circuits 3a and 3b in the period which will be described in the sixth embodiment. Below, a detailed description will be made taking, for example, the third embodiment as an example.

Figure 11:
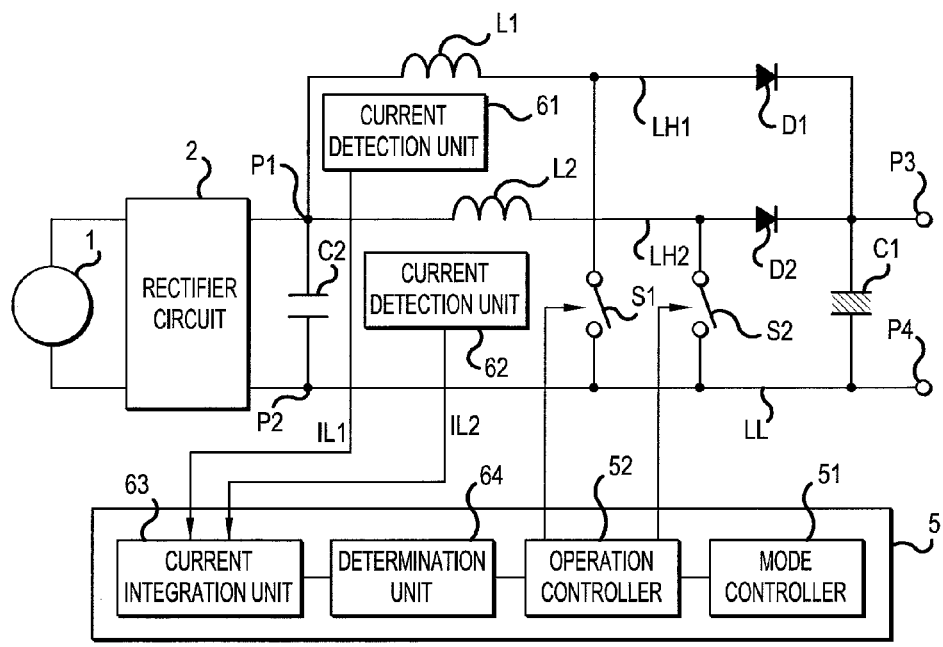
FIG. 11 is a diagram illustrating an example of a schematic configuration of a switching power supply circuit.
Figure 18:
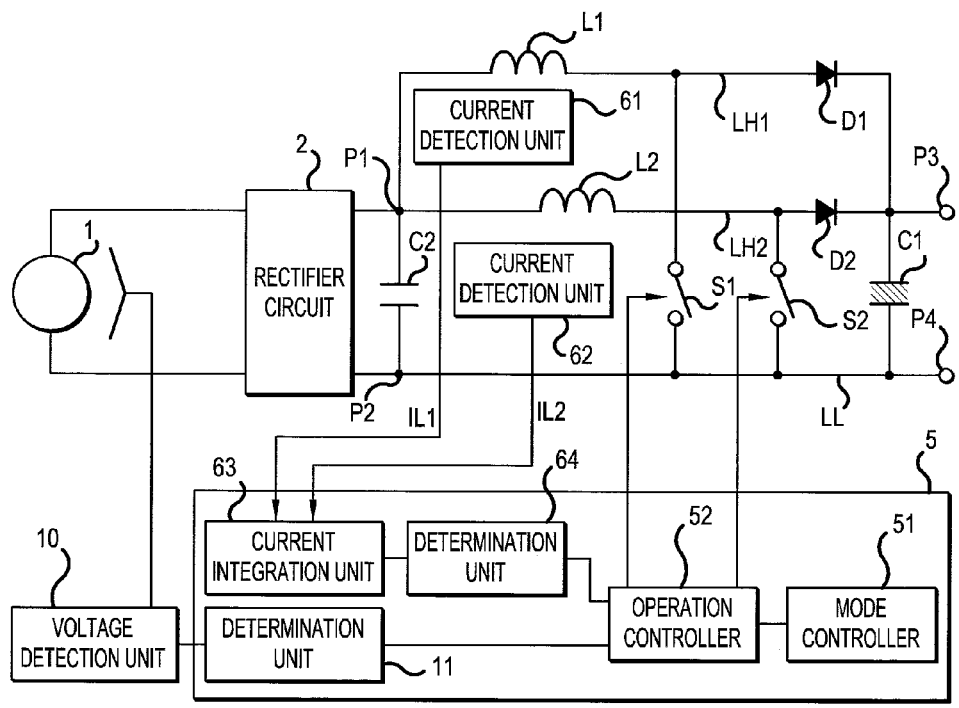
FIG. 18 is a diagram illustrating an example of a schematic configuration of a switching power supply circuit.

As exemplified in FIG. 18, the switching power supply circuit is further, as compared with the switching power supply circuit of FIG. 11, equipped with a voltage detection unit 10, and the controller 5 is further equipped with a determination unit 11. The voltage detection unit 10 detects, for example, an AC voltage on the input side of the rectifier circuit 2. The determination unit 11 determines whether the absolute value of the AC voltage is smaller than a predetermined standard voltage value, and if a positive determination is made, the determination unit 11 informs accordingly.

In the period when an integration value of the current IL1 from the start of operation of the chopper circuit 3a is greater than a standard integration value, and the absolute value of the AC voltage is smaller than the standard voltage value, the operation controller 52 suspends the chopping operation of the chopper circuit 3a and starts the chopping operation of the chopper circuit 3b. Similarly, in the period when an integration value of the current IL2 from the start of operation of the chopper circuit 3b is greater than the standard integration value and the absolute value of the AC voltage is smaller than the standard voltage value, the operation controller 52 suspends the chopping operation of the chopper circuit 3b and starts the chopping operation of the chopper circuit 3a.

As the standard voltage value, a value close to zero is employed, for example. By this, the chopping operations of the chopper circuits 3a and 3b are switched in the period when the AC voltage (in other words, the first DC voltage between the input terminals P1 and P2) is small. As a result, the variations of the first DC voltage and the AC voltage and the variation of the input current I associated with the switching of the chopping operations of the chopper circuits 3a and 3b can be reduced.

Note that the voltage detection unit 10 may detect the first DC voltage on the output side of the rectifier circuit 2. The first DC voltage pulsates with a period of N-th part of the period of an N phase AC voltage. In addition, the operation controller 52 may switch the chopping operations of the chopper circuits 3a and 3b when the value of the integrated current is greater than the standard integration value, and the first DC voltage is smaller than a predetermined second standard voltage value. This can also reduce the variations of the first DC voltage and the AC voltage and the variation of the input current I associated with the switching between the chopper circuits 3a and 3b.

Figure 19:
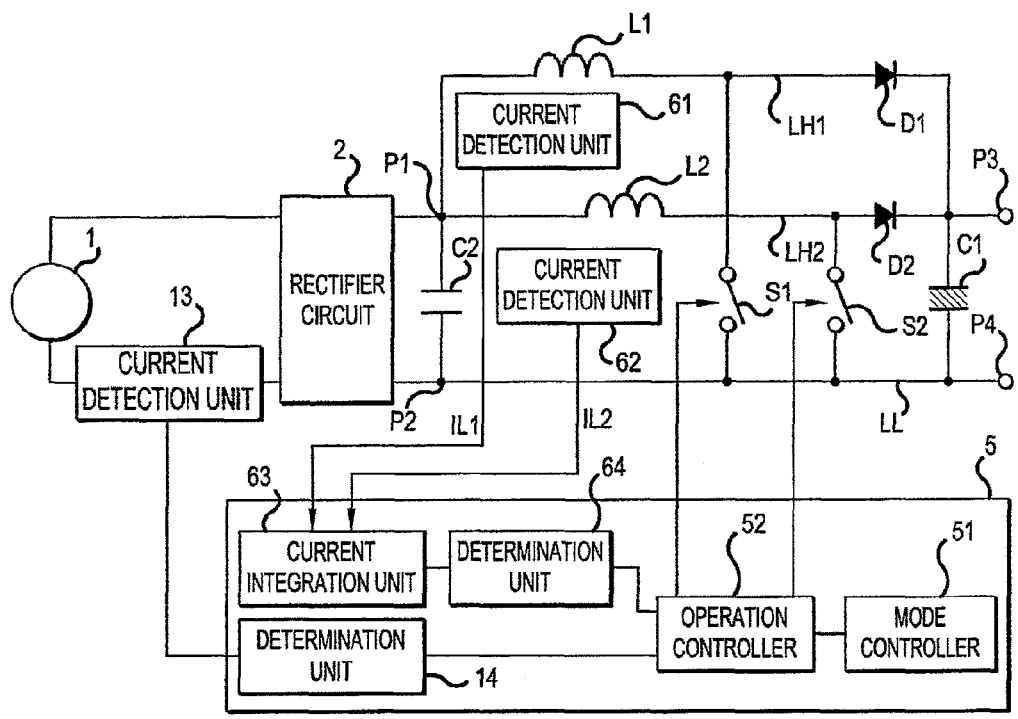
FIG. 19 is a diagram illustrating an example of a schematic configuration of a switching power supply circuit.

Further, as exemplified in FIG. 19, the switching power supply circuit may be further, as compared with the switching power supply circuit of FIG. 11, equipped with a current detection unit 13. The current detection unit 13 detects the AC current on the input side of the rectifier circuit 2, for example. The controller 5 is equipped with a determination unit 14. The determination unit 14 determines whether the absolute value of the AC current detected by the current detection unit 13 is smaller than a predetermined value, and if a positive determination is made, the determination unit 14 informs the operation controller 52 accordingly.

In a period when the value of the integrated current is greater than the standard integration value, and the absolute value of the AC current is smaller than a standard current value, the operation controller 52 switches the chopping operations of the chopper circuits 3a and 3b. As the standard current value, a value close to zero is employed, for example. By this, the chopping operations of the chopper circuits 3a and 3b is switched in the period when the AC current is low. As a result, the variation of the input current I associated with the switching between the chopper circuits 3a and 3b can be reduced.

Note that the current detection unit may detect the input current I flowing on the output side of the rectifier circuit 2. For example, the input current I may be detected as a sum of currents IL1 and IL2 detected by the current detection units 61 and 62. Then, the determination unit 14 determines whether the input current I is smaller than a second standard current value, and if a positive determination is made, the determination unit 14 informs the operation controller 52 accordingly.

When the value of the integrated current is greater than the standard integration value and the input current I is smaller than the second standard current value, the operation controller 52 switches the chopping operations of the chopper circuits 3a and 3b. By this, the chopping operations of the chopper circuits 3a and 3b is switched in the period when the input current I is low. As a result, the variation of the input current I associated with the switching between the chopper circuits 3a and 3b can be reduced.

Seventh Embodiment

In a case that the AC power source 1 which is connected to the switching power supply circuit is connected to other devices, for example, a TV or an electric light, it is not preferable that the variation of the power-supply voltage due to the switching power supply circuit causes flickering in such devices.

Figure 20:
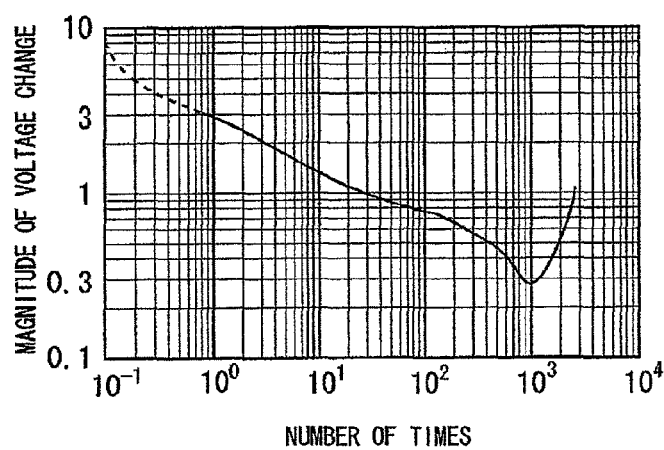
FIG. 20 is a diagram illustrating a short time flicker indicator.

FIG. 20 is a diagram illustrating a short time flicker indicator, and this graph is stipulated in IEC (International Electrotechnical Commission) 61000-3-3. The horizontal axis represents the number of times of voltage changes per one minute, where a step voltage change is counted as one time; and the vertical axis represents the magnitude of voltage change allowable to prevent flickering. This magnitude of voltage change is a magnitude, where a rated voltage is assumed to be 100%. In particular, for example, if 1,000 times of voltage changes occur per one minute, the magnitude of that voltage change needs to be smaller than about 0.27% of the rated voltage.

Here, since the variation can be created in the power-supply voltage due to the switching of the chopper operations of the chopper circuits 3a and 3b, the switching frequency of the chopper circuits 3a and 3b can be understood, in FIG. 20, as the number of voltage changes per one minute. Thus, it is preferable that the switching frequency is determined, avoiding the region in which the allowable voltage change is relatively small. For example, as the switching frequency, it is preferable to avoid the frequencies between 5 Hz to 50 Hz. By this, the allowable magnitude of the voltage change can be greater than 0.5% of the rated voltage.

Eighth Embodiment

The switching power supply circuits described in the first to seventh embodiments are provided in a heat pump unit, for example. As exemplified in FIG. 21, in the heat pump unit 100, a refrigerant circuit is configured with a compressor 103 and an expansion valve 104 provided on a pipe connecting two heat exchangers 101 and 102. In this refrigerant circuit, refrigerant is circulated. The compressor 103 compresses the refrigerant, and the expansion valve 104 throttle-expands the refrigerant. This can facilitate the heat exchange in the heat exchangers 101 and 102. In this refrigerant circuit, the compressor 103 and the expansion valve 104 are driven by electric power being supplied.

Further, if air cooled heat exchangers are employed as the heat exchangers 101 and 102, fans 105 and 106 can be provided to facilitate heat exchange. These fans 105 and 106 are driven also by electric power being supplied.

Figure 21:
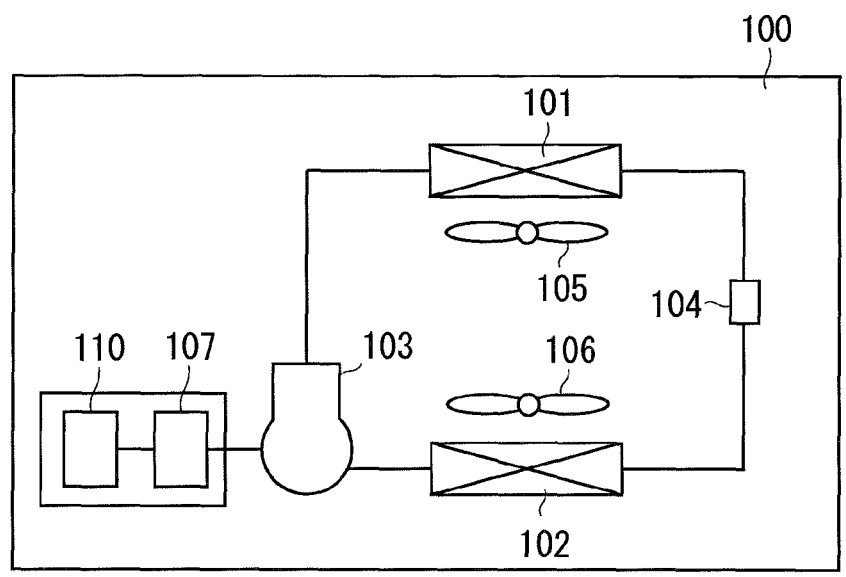
FIG. 21 is a diagram illustrating an example of a schematic configuration of a heat pump unit.

In the example in FIG. 21, the switching power supply circuit 110 outputs a DC voltage to a drive unit (for example, an inverter) 107 for driving the compressor 103, for example. In accordance with this, a heat pump unit employing an efficient switching power supply circuit can be provided. In particular, when the heat pump unit 100 is an air conditioner, the period when the compressor can be rotated at a low speed is long. This is because after the temperature in a room is made close to the vicinity of the set temperature, it is not necessary to show much of the cooling ability or the heating ability. When the compressor 103 is rotated at a low speed like this, a current supplied to the compressor 103 is relatively low, and thus the switching power supply circuit 110, which can improve the efficiency in the region of a low electric power, is especially useful.

Note that the switching power supply circuit 110 may supply a DC voltage to the drive unit for driving the expansion valve 104 and the fans 105 and 106.

This invention has been described in detail; however, all the above descriptions are examples in every aspect, and this invention is not limited thereto. It should be understood that not shown numerous deformation examples can be conceived without departing from the scope of this invention.

REFERENCE NUMERALS

2: Rectifier circuit
3: Chopper circuit
11, 60, 61, 62: Current detection unit
51: Mode controller
52: Operation controller
70: Period detection unit
81, 82: Temperature detection unit
90: Counter unit
D1, D2: Diode
L1, L2: Reactor
LH1, LH2, LL: DC line
P1, P2: Input terminal
P3, P4: Output terminal
S1, S2: Switching element

The invention claimed is:

1. A control device for a switching power supply circuit, including a pair of input terminals, a pair of output terminals, and a first and a second chopper circuits which are parallely connected to each other between said pair of input terminals and said pair of output terminals and each of which performs a chopping operation, wherein a constant-voltage source is connected between said pair of input terminals, the control device comprising:
  a mode controller which shifts an operation mode of said first and said second chopper circuits from a first mode to a third mode via a second mode as an electric power in said first and second chopper circuits increases;
  an operation controller which causes, in said first mode, said first chopper circuit to perform said chopping operation, and said second chopper circuit to suspend said chopping operation, in said second mode, causes said first chopper circuit and said second chopper circuit to alternately perform said chopping operation, and in said third mode, causes both of said first chopper circuit and said chopper circuit to perform said chopping operation; and a current detection unit which detects an input current flowing through said pair of input terminals, wherein said mode controller shifts said operation mode from said first mode to said third mode via said second mode as said input current increases.

2. The control device for a switching power supply circuit of claim 1 further comprising:

a period detection unit which counts elapsed time, wherein said operation controller suspends, in said second mode, said chopping operation of said first chopper circuit on a condition that a predetermined period of time has elapsed since start of said chopping operation of said first chopper circuit.

3. A heat pump unit comprising:

the control device for a switching power supply circuit of claim 1.

4. A control device for a switching power supply circuit, including a pair of input terminals, a pair of output terminals, and a first and a second chopper circuits which are parallely connected to each other between said pair of input terminals and said pair of output terminals and each of which performs a chopping operation, the control device comprising:

a mode controller which shifts an operation mode of said first and said second chopper circuits from a first mode to a third mode via a second mode as an electric power in said first and second chopper circuits increases;

an operation controller which causes, in said first mode, said first chopper circuit to perform said chopping operation, and said second chopper circuit to suspend said chopping operation, in said second mode, causes said first chopper circuit and said second chopper circuit to alternately perform said chopping operation, and in said third mode, causes both of said first chopper circuit and said second chopper circuit to perform said chopping operation; and a second current detection unit which detects a current flowing through said first chopper circuit, wherein said operation controller suspends, in said second mode, said chopping operation of said first chopper circuit on a condition that a value of integration of said current from start of said chopping operation of said first chopper circuit is greater than a predetermined value.

5. The control device for a switching power supply circuit of claim 4, wherein said mode controller shifts said operation mode to said first mode on a condition that in said second mode, said current is lower than a predetermined value.

6. A control device for a switching power supply circuit, including a pair of input terminals, a pair of output terminals, and a first and a second chopper circuits which are parallely connected to each other between said pair of input terminals and said pair of output terminals and each of which performs a chopping operation, the control device comprising:

a mode controller which shifts an operation mode of said first and said second chopper circuits from a first mode to a third mode via a second mode as an electric power in said first and second chopper circuits increases;

an operation controller which causes, in said first mode, said first chopper circuit to perform said chopping operation, and said second chopper circuit to suspend said chopping operation, in said second mode, causes said first chopper circuit and said second chopper circuit to alternately perform said chopping operation, and in said third mode, causes both of said first chopper circuit and said second chopper circuit to perform said chopping operation; and a second current detection unit which detects a current flowing through said first chopper circuit, wherein in said second mode, said operation controller switches execution/suspension of said chopping operation of said first chopper circuit with a shorter period as said current is higher.

7. A control device for a switching power supply circuit, including a pair of input terminals, a pair of output terminals, and a first and a second chopper circuits which are parallely connected to each other between said pair of input terminals and said pair of output terminals and each of which performs a chopping operation, the control device comprising:

a mode controller which shifts an operation mode of said first and said second chopper circuits from a first mode to a third mode via a second mode as an electric power in said first and second chopper circuits increases;

an operation controller which causes, in said first mode, said first chopper circuit to perform said chopping operation, and said second chopper circuit to suspend said chopping operation, in said second mode, causes said first chopper circuit and said second chopper circuit to alternately perform said chopping operation, and in said third mode, causes both of said first chopper circuit and said second chopper circuit to perform said chopping operation; and a temperature detection unit which detects a temperature of said first chopper circuit, wherein said operation controller suspends, in said second mode, said chopping operation of said first chopper circuit on a condition that said temperature is greater than a predetermined value.

8. The control device for a switching power supply circuit of claim 7, wherein said mode controller shifts said operation mode to said first mode when in said second mode, said temperature is smaller than a second predetermined value which is smaller than said predetermined value.

9. A control device for a switching power supply circuit, including a pair of input terminals, a pair of output terminals, and a first and a second chopper circuits which are parallely connected to each other between said pair of input terminals and said pair of output terminals and each of which performs a chopping operation, the control device comprising:

a mode controller which shifts an operation mode of said first and said second chopper circuits from a first mode to a third mode via a second mode as an electric power in said first and second chopper circuits increases;

an operation controller which causes, in said first mode, said first chopper circuit to perform said chopping operation, and said second chopper circuit to suspend said chopping operation, in said second mode, causes said first chopper circuit and said second chopper circuit to alternately perform said chopping operation, and in said third mode, causes both of said first chopper circuit and said second chopper circuit to perform said chopping operation; and a first and a second temperature detection units which detect temperatures of said first and said second chopper circuits, respectively, wherein said operation controller suspends, in said second mode, said chopping operation of said first chopper circuit on a condition that a temperature of said first chopper circuit is greater than a temperature of said second chopper circuit by a value more than a predetermined value.

10. The control device for a switching power supply circuit of claim 8, wherein said mode controller shifts said operation mode to said first mode when in said second mode, said temperature is smaller than a second predetermined value which is smaller than said predetermined value.

11. A control device for a switching power supply circuit, including a pair of input terminals, a pair of output terminals, and a first and a second chopper circuits which are parallely connected to each other between said pair of input terminals and said pair of output terminals and each of which performs a chopping operation, the control device comprising:
   a mode controller which shifts an operation mode of said first and said second chopper circuits from a first mode to a third mode via a second mode as an electric power in said first and second chopper circuits increases;
   an operation controller which causes, in said first mode, said first chopper circuit to perform said chopping operation, and said second chopper circuit to suspend said chopping operation, in said second mode, causes said first chopper circuit and said second chopper circuit to alternately perform said chopping operation, and in said third mode, causes both of said first chopper circuit and said second chopper circuit to perform said chopping operation; and
   a counter unit which counts a number of chopping in said chopping operation of said first chopper circuit,
   wherein said operation controller suspends, in said second mode, said chopping operation of said first chopper circuit on a condition that said number since start of said chopping operation of said first chopper circuit is greater than a predetermined value.

12. A control device for a switching power supply circuit, including a pair of input terminals, a pair of output terminals, and a first and a second chopper circuits which are parallely connected to each other between said pair of input terminals and said pair of output terminals and each of which performs a chopping operation, the control device comprising:
   a mode controller which shifts an operation mode of said first and said second chopper circuits from a first mode to a third mode via a second mode as an electric power in said first and second chopper circuits increases;
   an operation controller which causes, in said first mode, said first chopper circuit to perform said chopping operation, and said second chopper circuit to suspend said chopping operation, in said second mode, causes said first chopper circuit and said second chopper circuit to alternately perform said chopping operation, and in said third mode, causes both of said first chopper circuit and said second chopper circuit to perform said chopping operation; and
   a rectifier circuit which rectifies an AC voltage and applies a DC voltage to said pair of input terminals; and
   a voltage detection unit which detects said AC voltage or said DC voltage,
   wherein said operation controller starts or suspends, in said second mode, said chopping operation of said first chopper circuit in a period when an absolute value of said AC voltage is lower than a predetermined value.

13. A control device for a switching power supply circuit, including a pair of input terminals, a pair of output terminals, and a first and a second chopper circuits which are parallely connected to each other between said pair of input terminals and said pair of output terminals and each of which performs a chopping operation, the control device comprising:
   a mode controller which shifts an operation mode of said first and said second chopper circuits from a first mode to a third mode via a second mode as an electric power in said first and second chopper circuits increases;
   an operation controller which causes, in said first mode, said first chopper circuit to perform said chopping operation, and said second chopper circuit to suspend said chopping operation, in said second mode, causes said first chopper circuit and said second chopper circuit to alternately perform said chopping operation, and in said third mode, causes both of said first chopper circuit and said second chopper circuit to perform said chopping operation; and
   a rectifier circuit which rectifies an AC voltage and applies a DC voltage to said pair of input terminals; and
   a third current detection unit which detects an AC current flowing on an input side of said rectifier circuit or said input current,
   wherein said operation controller starts or suspends, in said second mode, said chopping operation of said first chopper circuit in a period when an absolute value of said AC current is lower than a predetermined value.

* * * * *